(12) United States Patent
Madsen

(10) Patent No.: US 6,956,991 B2
(45) Date of Patent: Oct. 18, 2005

(54) COMPACT SOLID-STATE VARIABLE OPTICAL DELAY LINE WITH A LARGE CONTINUOUS TUNING RANGE

(75) Inventor: Christi Kay Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 79 days.

(21) Appl. No.: 10/634,481

(22) Filed: Aug. 5, 2003

(65) Prior Publication Data

US 2005/0031260 A1 Feb. 10, 2005

(51) Int. Cl.[7] ............................................... G02B 6/26
(52) U.S. Cl. ........................ 385/27; 385/15; 385/147
(58) Field of Search .............................. 385/15, 16, 27

(56) References Cited

U.S. PATENT DOCUMENTS 4,934,777 A * 6/1990 Jou et al. ..................... 385/27
5,125,051 A * 6/1992 Goutzoulis et al. ........... 385/27
5,943,636 A * 8/1999 Baldwin et al. .............. 702/85
6,289,151 B1 * 9/2001 Kazarinov et al. ............ 385/32

* cited by examiner

Primary Examiner—John D. Lee
Assistant Examiner—James D. Stein

(57) ABSTRACT

In accordance with the invention, a variable delay line with continuous tuning comprises an optical path providing at least one continuous delay element coupled to a series of switchable binary fixed delays. The series of switchable delays can be configured to select a delay among a plurality of incremental delays, and the continuous delay can set a continuous delay in a range encompassing the delay increment of the binary series. In a preferred embodiment, the variable delay element comprises a tunable all pass filter (APF) with delay tunable from essentially 0 to a time T and the switchable binary fixed delays form a series (0,T), (0, 2T), (0, 4T), . . . , [0, (2n+1)], where n is an integer $\geq 0$. The switches are preferably Mach-Zehnder switches. In an alternative embodiment, the continuous delay element comprises a suitable pair of APF arms. The path and all components can be fabricated as an integrated planar waveguide (solid state) device.

7 Claims, 2 Drawing Sheets

COMPACT SOLID-STATE VARIABLE OPTICAL DELAY LINE WITH A LARGE CONTINUOUS TUNING RANGE

CROSS REFERENCE TO RELATED APPLICATIONS

This case is related to U.S. application Ser. No. 20050031248 filed by J. LeGrange et al. concurrently herewith and entitled "Variable Optical Delay Line With a Large Continuous Tuning Range."

FIELD OF THE INVENTION

This invention relates to variable optical delay lines and, in particular, to a variable optical delay line with continuous tuning and a large tuning range. The delay line is particularly suited for solid state implementation as an integrated optical waveguide device.

BACKGROUND OF THE INVENTION

One of the major advances in communications in recent years has been the increased use of optical fiber systems for carrying large quantities of information with low distortion and low cost over great distances.

Optical delay lines are important components in optical fiber communication systems. They are critical components in switching streams of optical signals from one path to another. They are used in packet switching for Internet applications, and they are building blocks in the correlation filters used to recognize packet addresses. Delay lines are also used in the buffers that control the timing of signal routing. And they are used for synchronizing data bits, for compensating dispersion between different optical paths, and for compensating differential delay between paths.

Variable delay lines are needed because different delays may be required at different times. In addition to variation required by the dynamics of optical network components, variation of delays in the optical network may be required to compensate path length differences in RF links in the network such as differences due to changes in a satellite orbit, due to the use of multiple ground antennas, or due to atmospheric scintillation or beam squinting.

A variable optical delay line typically comprises a plurality of optical fibers, each cut to a slightly different length, and a fiber switch to select the fiber path, thereby selecting the delay time. In principle this should work, but in practice it has serious shortcomings in high resolution systems. Cutting fibers to a precision of millimeters is difficult, and this difficulty limits the achievable accuracy of delay time. Moreover, a variable delay line having a large dynamic range will require many precisely cut fibers. It is not practical to provide sufficient precisely cut fibers to provide fine delay increments over a large dynamic range. Ideally the variable delay line is also compact. It is difficult to achieve compact structures of many fibers of different lengths.

In addition is the problem of switching an input signal from one fiber to another. Ideally switching is "hitless" in that no transmitted data is lost. This may be difficult to achieve in switching a beam from one fiber to a nonadjacent other fiber. Accordingly there is a need for an improved variable optical delay line that is compact, provides high resolution over a large dynamic range and is preferably hitless.

SUMMARY OF THE INVENTION

In accordance with the invention, a variable delay line with continuous tuning comprises an optical path providing at least one continuous delay element coupled to a series of switchable binary fixed delays. The series of switchable delays can be configured to select a delay among a plurality of incremental delays, and the continuous delay can set a continuous delay in a range encompassing the delay increment of the binary series. In a preferred embodiment, the variable delay element comprises a tunable all pass filter (APF) with delay tunable from essentially 0 to a time T and the switchable binary fixed delays form a series (0,T), (0, 2T), (0, 4T), ..., [0, (2n+1)], where n is an integer $\geq 0$. The switches are preferably Mach-Zehnder switches. In an alternative embodiment, the continuous delay element comprises a suitable pair of APF arms. The path and all components can be fabricated as an integrated planar waveguide (solid state) device.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for purposes of illustrating the concepts of the invention and are not to scale.

DETAILED DESCRIPTION

Figure 1:
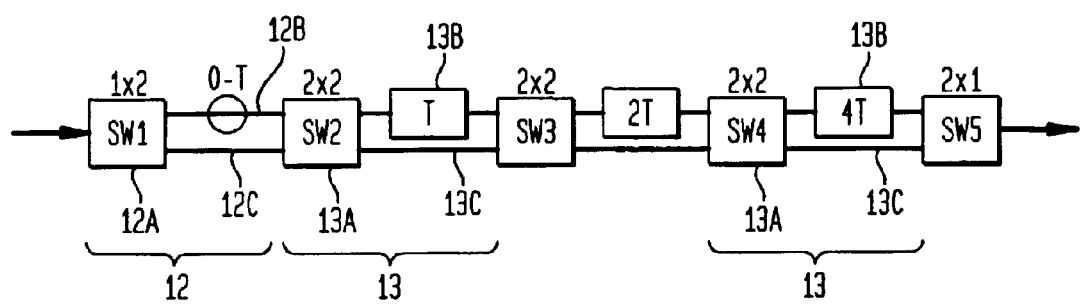
FIG. 1 is a schematic view a first embodiment of a variable delay line in accordance with the invention.

Referring to the drawings, FIG. 1 is a schematic view of a variable optical delay line 10 with continuous tuning over a broad range of delay. The delay line 10 comprises a switchable optical path comprising at least one continuous delay element 12 and a plurality of switchable fixed delay elements 13. In an advantageous embodiment, the continuous delay element 12 is a switchable variable delay element comprising a 1×2 switch 12A for receiving an optical input signal and a pair of output arms. The arms comprise a continuous delay arm 12B and a substantially zero delay arm 12C. The switch 12A determines which arm the input signal is directed to.

Each switchable fixed delay element 13 can conveniently comprise a 2×2 switch 13A having a pair of inputs for receiving an optical signal from either output of a proceeding delay element and a pair of output arms. The arms comprise a fixed delay arm 13B and a substantially delay free arm 13C. The switch 13A determines the arm to which an input signal is directed. The switchable elements 12, 13 are configured to provide continuous tuning over a relatively broad range of delay. The continuous delay arm 12B can provide continuous tuning but over only a relatively narrow range which can be designated (0,T). If the switchable fixed delay arms 13B provide delays T, 2T, 4T, then combinations of switch selected fixed delays can be chosen to provide coarse delays of 0, T, 2T, 3T, 4T, 5T, 6T and 7T. The continuous delay arm 12B can then be tuned and be switched in so as to provide any additional delay in the range (0, T). Thus the device can provide any desired delay in the continuous range (0, 8T). Table 1 below shows the switch states over a tuning range of 0 to 5T.

TABLE 1

Switch states for various sub-tuning ranges.

| Tuning range | Sw1 | Sw2 | Sw3 | Sw4 | Sw5 |
|---|---|---|---|---|---|
| 0–T | — | X | — | — | X |
| Switch at T | X | X | X | — | X |
| T–2T | — | — | X | — | X |
| Switch at 2T | X | — | X | X | X |
| 2T–3T | — | X | X | X | X |
| Switch at 3T | X | X | — | X | X |
| 3T–4T | X | — | — | X | — |
| Switch at 4T | X | — | — | X | — |
| 4T–5T | — | X | — | X | — |
| Switch at 5T | X | X | X | X | — |

Figure 2:
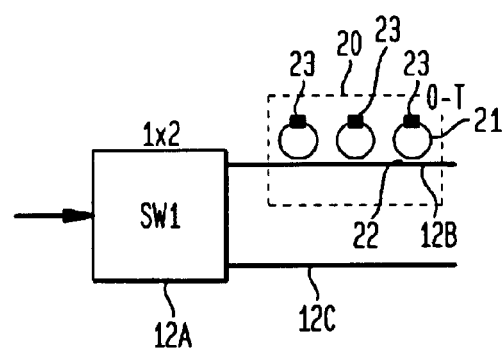
FIG. 2 illustrates an exemplary continuous delay element useful in the delay line of FIG. 1.

The continuous delay element 12 can comprise any one of continuously a variety of tunable optical delay devices such as all pass filters or tunable chirped gratings. A preferred continuous delay element, shown in FIG. 2, comprises a tunable multi-stage all pass filter (APF) 20 in arm 12B. The APF 20 is a ring cascade structure wherein each ring resonator 21 is independently coupled to a splitter/combiner region 22. The feedback delay path has a length which includes the length of each of the ring resonators 21, and the path length of each resonator—and hence the delay—can be tuned by respective phase shifters 23 and by the effective coupling in the splitter/combiner region 22 (which can also be tuned by phase shifters). Phase shifting can be electro optic, thermo optic or by current injection. The structure and operation of such tunable APF delay devices is set forth in greater detail in U.S. Pat. No. 6,289,151 issued to Kazarinov et al. on Sept. 11, 2001 and entitled "All Pass Optical Filters." U.S. Pat. No. 6,289,151 is incorporated herein by reference.

The fixed delay arms 13B are advantageously lengths of planar waveguide appropriately curved to a length that achieves the desired delay. Since the device is advantageously comprised of high index contrast waveguide, relatively tight bends can be made in the waveguide thereby minimizing the area required for fixed delay paths. The fixed delay paths can also include reflectors for double passing or waveguide coils for long delay.

Figure 3:
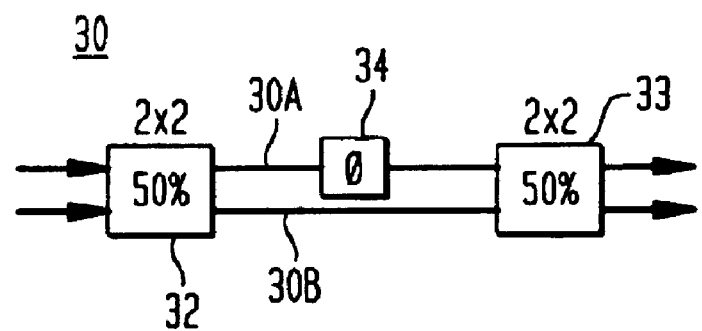
FIG. 3 shows an exemplary switch useful in the delay line of FIG. 1.

The 2×2 optical switches can be any one of a variety of such devices known in the art. A preferred 2×2 switch is a Mach-Zehnder switch 30 schematically illustrated in FIG. 3. In essence, the switch comprises a pair of waveguide arms 30A, 30B coupled together at an input coupler 32 and an output coupler 33. (The couplers are typically 3 dB.) One or both arms are provided with controllable phase shifters 34 for controlling the pathlength difference between the two arms at the output coupler 33. The phase shift can be controlled to provide constructive interference at a selected output waveguide. The same device can operate as 1×2 switch 12A if light is applied to only one input port.

Preferred phase shifters are the high-speed thermo-optic phase shifters described in the co-pending application of C. Madsen et al., Ser. No. 20040240818 filed May 30, 2003 and entitled "High Speed Thermo-Optic Phase Shifter and Devices Comprising the Same", which is incorporated herein by reference.

The variable delay line 10 is advantageously implemented as an integrated planar waveguide device using well known silicon optical bench technology. A silica cladding layer is formed on a silicon substrate. A pattern of doped core glass is then formed on the cladding using photolithographic techniques similar to those used in the fabrication of semiconductor integrated circuits, and an upper cladding is deposited overlying the core pattern. Phase shifters can then be formed overlying the regions of the core in accordance with techniques well known in the art.

Figure 4:
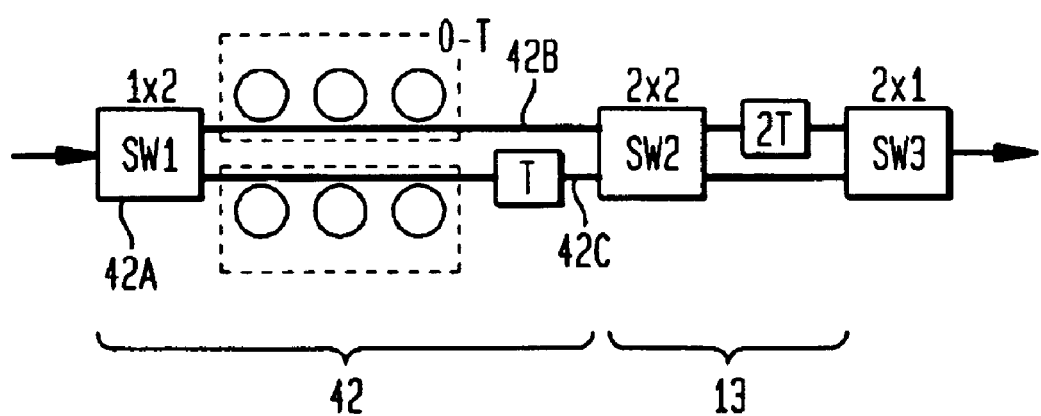
FIG. 4 is a schematic view of an alternative embodiment of a variable delay line.

FIG. 4 illustrates an alternative design for a variable optical delay line that reduces the number of switches. The FIG. 4 embodiment is similar to the FIG. 1 embodiment except that the continuous delay element 42 has two variable delay arms 42B and 42 C. Arm 42B comprises a 0 to T continuous delay, and arm 42C comprises both a 0 to T continuous delay and a fixed delay T. By switching between arms 42B and 42C, the 1×2 switch 42A makes redundant the first 2×2 switch shown in FIG. 1 and thereby reduces the number of switches. Otherwise the structure, fabrication and operation of the FIG. 4 device are substantially the same as described for FIG. 1.

The invention can now be more closely understood by consideration of the following specific examples.

EXAMPLE 1

The layout of FIG. 1 is configured to provide a continuous delay arm APF with T=320 ps. The device thus accommodates a full tuning range of 8T or 2560 ps. Continuous tuning is achieved with the APFs by simultaneous changing two switches between equal path lengths when the APFs are at their maximum delay, after which they are tuned to their minimum delay for the next sub-range. This is the operation set forth in Table 1 where x refers to the cross port configuration and—refers to the bar port. By making two path lengths identical before switching, a coherent switch is achieved that is transparent to an incoming data signal.

This hitless switching capability is particularly well-suited to implementation in a planar waveguide platform. In glass waveguides, 100 ps corresponds to a length of 2 cm. For a bend radius of 3 mm, a delay length of 2 cm is achieved for each loop. Consequently the longest delay in this example (1280 ps) will require only 13 loops and a very small chip size of less than 1 $cm^2$.

Tuning resolutions of less than 5 ps are readily achieved with all pass filters. To achieve such resolutions by cascading fixed delay sections would require an additional five stages beyond those of FIG. 1. Since the number of switch states scales as $2^N-1$ where N is the number of stages, the device simplifies by a factor or 32 the task of controlling switching.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. A variable optical delay line with a large continuous tuning range comprising:

an discretely variable optical delay line for receiving an optical signal, the discretely variable optical delay line comprising a plurality of switchable binary paths configured to provide signal delay paths selected from a sequence of discretely differing delays; and serially optically coupled with the discretely variable delay line, a continuously variable optical delay line for receiving the optical signal to provide a continuously variable delay from a range of delays substantially encompassing a delay increment in the discretely variable delay line.

2. The variable optical delay line of claim 1 wherein the discretely variable optical delay line is configured to provide a sequence of delays that differ by a delay increment T and the continuously variable optical delay line provides a delay in the continuous range (0,T).

3. The variable optical delay line of claim 1 wherein the discretely variable optical delay line comprises a plurality of switchable binary fixed delays in which one delay is substantially 0 and the other delay is substantially (2n+1) T where T is the delay increment and n is an integer $\geq 0$.

4. The variable optical delay line of claim 3 wherein the discretely variable optical delay line comprises a switchable binary fixed delay of (0,T) serially connected to a switchable binary delay of (0, 2T), where T is the delay element.

5. The variable optical delay line of claim 1 wherein the continuously variable optical delay line comprises a switchable binary delay in which one delay is substantially zero and the other delay is a continuously variable delay in the range (0,T) where T is the delay increment.

6. The variable optical delay line of claim 1 wherein the continuously variable optical delay line comprises a switchable binary delay line in which one delay is a continuously variable delay in the range (0,T), and the other delay is a continuously variable delay in the range (T, 2T), where T is the delay increment.

7. The variable optical delay line of claim 1 wherein the continuously variable optical delay line comprises an all pass filter.

* * * * *